US011161525B2

(12) United States Patent
Shikari et al.

(10) Patent No.: US 11,161,525 B2
(45) Date of Patent: Nov. 2, 2021

(54) FOREGROUND EXTRACTION USING SURFACE FITTING

(71) Applicant: Motional AD LLC, Boston, MA (US)

(72) Inventors: Abbas Shikari, Singapore (SG); Jiaxin Li, Singapore (SG); Thomas Koelbaek Jespersen, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/125,789

(22) Filed: Dec. 17, 2020

(65) Prior Publication Data
US 2021/0188312 A1 Jun. 24, 2021

Related U.S. Application Data

(60) Provisional application No. 62/950,900, filed on Dec. 19, 2019.

(51) Int. Cl.
B60W 60/00 (2020.01)
G06K 9/62 (2006.01)
G01S 17/931 (2020.01)
G01S 17/42 (2006.01)
G01S 7/48 (2006.01)
(Continued)

(52) U.S. Cl.
CPC ...... B60W 60/001 (2020.02); B60W 30/0956 (2013.01); B60W 40/076 (2013.01); G01C 21/3453 (2013.01); G01C 21/3691 (2013.01); G01S 7/4808 (2013.01); G01S 17/42 (2013.01); G01S 17/931 (2020.01); G06K 9/6298 (2013.01); B60W 2420/52 (2013.01); B60W 2552/15 (2020.02)

(58) Field of Classification Search
None
See application file for complete search history.

(56) References Cited

U.S. PATENT DOCUMENTS 8,605,998 B2 * 12/2013 Samples ............ G06K 9/00201
382/159
8,825,391 B1 9/2014 Urmson et al.
(Continued)

FOREIGN PATENT DOCUMENTS

DE 10330011 2/2005
DE 102019100497 7/2019
(Continued)

OTHER PUBLICATIONS

[No Author Listed], SAE "International Standard J3016: Taxonomy and Definitions for Terms Related," SAE International, Sep. 30, 2016, 30 pages.

Primary Examiner — Jonathan M Dager
(74) Attorney, Agent, or Firm — Fish & Richardson P.C.

(57) ABSTRACT

Techniques are provided for foreground extraction from a point cloud (e.g., a LiDAR point cloud) using surface fitting. In an embodiment, one or more processors of a vehicle can receive point cloud data from one or more vehicle sensors. The one or more processors can identify points in the point cloud data as foreground points or ground points using a spatial Kalman filter to capture changes in the terrain. A route or trajectory in a driving area for the vehicle can be generated using the identified foreground points and ground points. A vehicle controller can control the vehicle while the vehicle is traveling on the route or trajectory in the driving area.

28 Claims, 17 Drawing Sheets

(51) Int. Cl.
*B60W 30/095* (2012.01)
*G01C 21/34* (2006.01)
*G01C 21/36* (2006.01)
*B60W 40/076* (2012.01)

(56) References Cited

U.S. PATENT DOCUMENTS

| | | | | |
|---|---|---|---|---|
| 10,152,771 | B1* | 12/2018 | Li | G01S 7/4808 |
| 10,436,884 | B2* | 10/2019 | Wu | G01S 17/86 |
| 10,699,167 | B1* | 6/2020 | Dowdall | G06K 9/6263 |
| 10,884,131 | B1* | 1/2021 | Allais | G01S 17/86 |
| 10,884,411 | B1* | 1/2021 | Allais | G01S 17/89 |
| 10,928,830 | B1* | 2/2021 | Tran | G05D 1/0088 |
| 2009/0310867 | A1* | 12/2009 | Matei | G06T 7/11 |
| | | | | 382/195 |
| 2014/0118716 | A1* | 5/2014 | Kaganovich | G06T 7/254 |
| | | | | 356/4.01 |
| 2016/0379366 | A1* | 12/2016 | Shah | G06T 7/38 |
| | | | | 345/419 |
| 2018/0075320 | A1* | 3/2018 | Zermas | G06T 7/248 |
| 2018/0293447 | A1* | 10/2018 | Kawano | G06T 7/73 |
| 2018/0307921 | A1* | 10/2018 | Vallespi-Gonzalez | G01S 17/89 |
| 2018/0348346 | A1* | 12/2018 | Vallespi-Gonzalez | G01S 7/4802 |
| 2018/0349746 | A1* | 12/2018 | Vallespi-Gonzalez | G01S 17/89 |
| 2019/0179023 | A1* | 6/2019 | Englard | G05D 1/0231 |
| 2019/0258737 | A1* | 8/2019 | Wang | G06K 9/00791 |
| 2019/0324148 | A1* | 10/2019 | Kim | G01S 17/89 |
| 2020/0180612 | A1* | 6/2020 | Finelt | B60W 30/09 |
| 2020/0257301 | A1* | 8/2020 | Weiser | G05D 1/0214 |
| 2020/0341466 | A1* | 10/2020 | Pham | G01C 21/26 |
| 2020/0410254 | A1* | 12/2020 | Pham | G06K 9/726 |

FOREIGN PATENT DOCUMENTS

| | | |
|---|---|---|
| GB | 2471276 | 12/2010 |
| GB | 2576265 | 2/2020 |
| WO | WO 2017/220705 | 12/2017 |
| WO | WO 2018/166747 | 9/2018 |

* cited by examiner

FOREGROUND EXTRACTION USING SURFACE FITTING

RELATED APPLICATION

This disclosure claims priority to U.S. Provisional Patent Application Ser. No. 62/950,900, entitled "FOREGROUND EXTRACTION USING SURFACE FITTING" and filed on Dec. 19, 2019, the entire contents of which are incorporated herein by reference.

TECHNICAL FIELD

This description relates generally to operation of vehicles and specifically to foreground extraction from point clouds.

BACKGROUND

LiDAR (Light Detection and Ranging) is a technology employed by autonomous vehicles that uses light (e.g., bursts of light such as infrared light) to obtain data about physical objects in its line of sight. A LiDAR system produces LiDAR data as collections of three-dimensional (3D) or two-dimensional (2D) points (also known as a point clouds) that are used to construct a representation of the environment in which the vehicle is operating. It is often desired to use LiDAR point clouds to detect pedestrians and other objects in the environment. As part of the detection process, the point cloud is segmented into "background" and "foreground", where "background" refers to fixed ground, buildings and trees, etc., and "foreground" refers to moving objects such as cyclists and moving pedestrians and vehicles. It is also desirable to have an accurate picture of a drivable area that can be used for planning and routing. Many solutions have been proposed for foreground/background segmentation (hereinafter also referred to as "foreground extraction"). These methods, such as 2D Bayesian linear regression (RLS) are slow, do not operate on merged LiDAR point clouds and tend to generate false negatives in certain driving scenarios, such as missing road sloped obstacles, since RLS is not sufficiently adaptive to changes in terrain.

SUMMARY

Techniques are provided for foreground extraction from a point cloud (e.g., a LiDAR point cloud) using surface fitting.

In an embodiment, a method comprises: receiving, using one or more processors of a vehicle, point cloud data from one or more vehicle sensors; identifying, using the one or more processors, points in the point cloud data as foreground points or ground points using a spatial Kalman filter configured to model changes in terrain; generating a route or trajectory in a driving area for the vehicle using the identified foreground points and ground points; and controlling, using a vehicle controller, the vehicle while the vehicle is traveling on the route or trajectory in the driving area.

In an embodiment, a method comprises: receiving, using one or more processors of a vehicle, point cloud data output by one or more sensors of the vehicle; transforming, using the one or more processors, the point cloud data into a grid comprising multiple cells; for each point in each cell: computing, using the one or more processors, a measured height of the point and a measured slope of terrain at the measured height in the grid; computing, using the one or more processors, a predicted height of the point and a predicted slope of the terrain at the predicted height using a dynamic model; computing, using the one or more processors, a first statistical model representing error in the dynamic model and a second statistical model representing measurement error in the measured height and the measured slope; computing, using the one or more processors, a first innovation between the predicted height and the measured height; computing, using the one or more processors, a second innovation between the predicted slope and the measured slope; comparing, using the one or more processors, the first innovation and the second innovation to an innovation covariance, wherein the innovation covariance is based on at least one of the first statistical model or the second statistical model; identifying, using the one or more processors, each point in each cell as a foreground point or a ground point based on a result of the comparing; updating, using the one or more processors, the predicted height of each identified ground point; generating, using the one or more processors, a route or trajectory in a driving area based on the updated ground points; and navigating, using a control circuit of the vehicle, the vehicle along the route or trajectory in the driving area.

In an embodiment, the points in the grid are processed in order according to respective distances of the points from the one or more sensors.

In an embodiment, for each point identified as a foreground point, whether or not there are other foreground points higher or lower than the foreground point by a threshold amount is determined. In accordance with determining that there are other foreground points higher or lower than the foreground point by a threshold amount, the foreground point is identified as belonging to an object. In accordance with determining that there are no other foreground points higher or lower than the foreground point by a threshold amount, the foreground point is identified as belonging to a roadside curb.

In an embodiment, the dynamic model is a constant first order model.

In an embodiment, the first statistical model is tuned based at least in part on whether the vehicle is on road or off road.

In an embodiment, the grid is a two-dimensional (2D) polar grid comprising multiple radial cells.

In an embodiment, for each radial direction in the 2D polar grid, phantom points are added to the 2D polar grid near to the vehicle origin.

In an embodiment, the threshold is an innovation covariance based on a sum of the first statistical model and the second statistical model.

In an embodiment, the first statistical model represents a probability that the terrain will change within the cell.

In an embodiment, the predicted height and the predicted slope are computed by a spatial Kalman filter, the first statistical model is a process noise covariance and the second statistical model is a measurement noise covariance.

One or more of the disclosed embodiments provide one or more of the following advantages. The disclosed embodiments operate on a merged point cloud (point clouds from multiple LiDARs) and have a faster run time (e.g., about 25 ms) than traditional foreground extraction algorithms, such as 2D Bayesian linear regression (RLS). The spatial Kalman filter formulation provides an interpretable rejection criteria based on a prediction-measurement error (innovation) and an interpretable model variation based on covariance uncertainty matrix (P), process noise covariance matrix (Q) and measurement noise covariance matrix (R). The proposed surface fitting approach has fewer false negatives (e.g., misses on road sloped obstacles) and distinguishes between roadside curbs and foreground objects.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
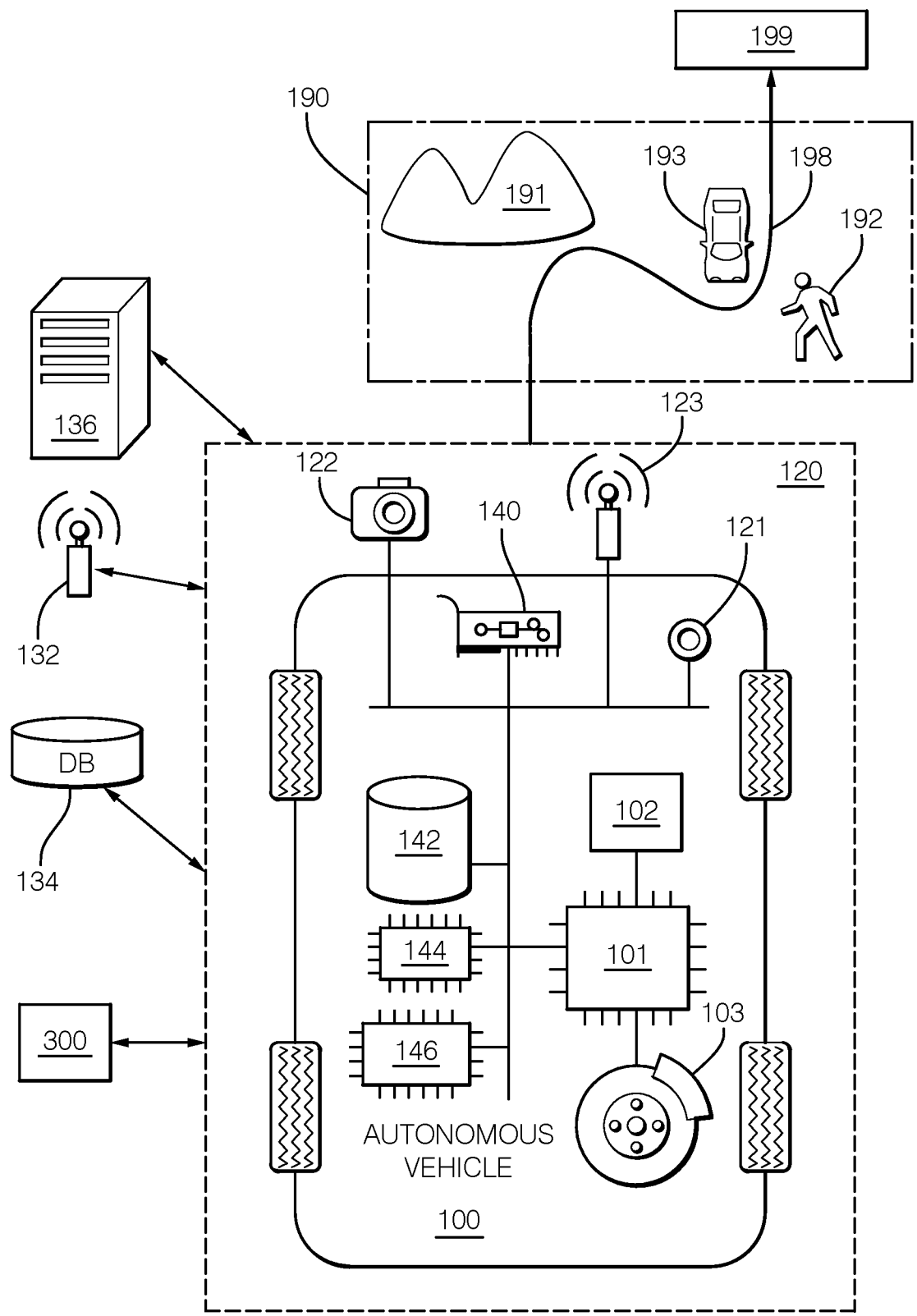
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
    2. System Overview
    3. Autonomous Vehicle Architecture
    4. Autonomous Vehicle Inputs
    5. Autonomous Vehicle Planning
    6. Autonomous Vehicle Control
    7. Foreground Extraction Using Spatial Kalman Filter General Overview Techniques are provided for foreground extraction from a point cloud (e.g., a LiDAR point cloud) using surface fitting. More particularly, parameterized Bayesian-mean-shifting regression of two spatial variables, geometric model of the ground is employed where outliers of the geometric model are labeled as foreground. In an embodiment, a spatial Kalman filter (SKF) is used for surface fitting. The geometric model is initialized with the ground under a vehicle (all points labeled ground). A LiDAR point cloud is then projected into a two-dimensional polar grid having a plurality of cells. For each cell in the grid, the points are sorted by distance to the vehicle and from lowest to highest height, where the nearest and lowest height points are processed first. For each point in each cell, the height of the point is measured from the location of the point in the 2D polar grid. A slope at the point location is computed from a current and a previous measured height.

A Bayesian filter (e.g., the SKF) formulation is used to predict the height and slope of the point. Innovations between the measured and predicted height and the measured and predicted slope are compared to an innovation covariance comprising a sum of the process noise covariance and measurement noise covariance to determine outliers of the geometric model. The outliers are labeled/classified as foreground and the non-outlier points are labeled/classified as ground.

The measured height and slope of the point are used in the SKF formulation to update the predicted height and slope of the point. The updated predicted height and slope are stored in memory and used in the next measurement SKF epoch. In an embodiment, the labeled foreground and ground points are sent to a downstream fusion and tracking application that tracks objects and other downstream applications, such as, for example, construction zone detection and occlusion modeling. In an embodiment, the labeled foreground points are reviewed against a roadside curb model and the foreground points that are identified as curb points by the model are discarded or reclassified as ground points.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
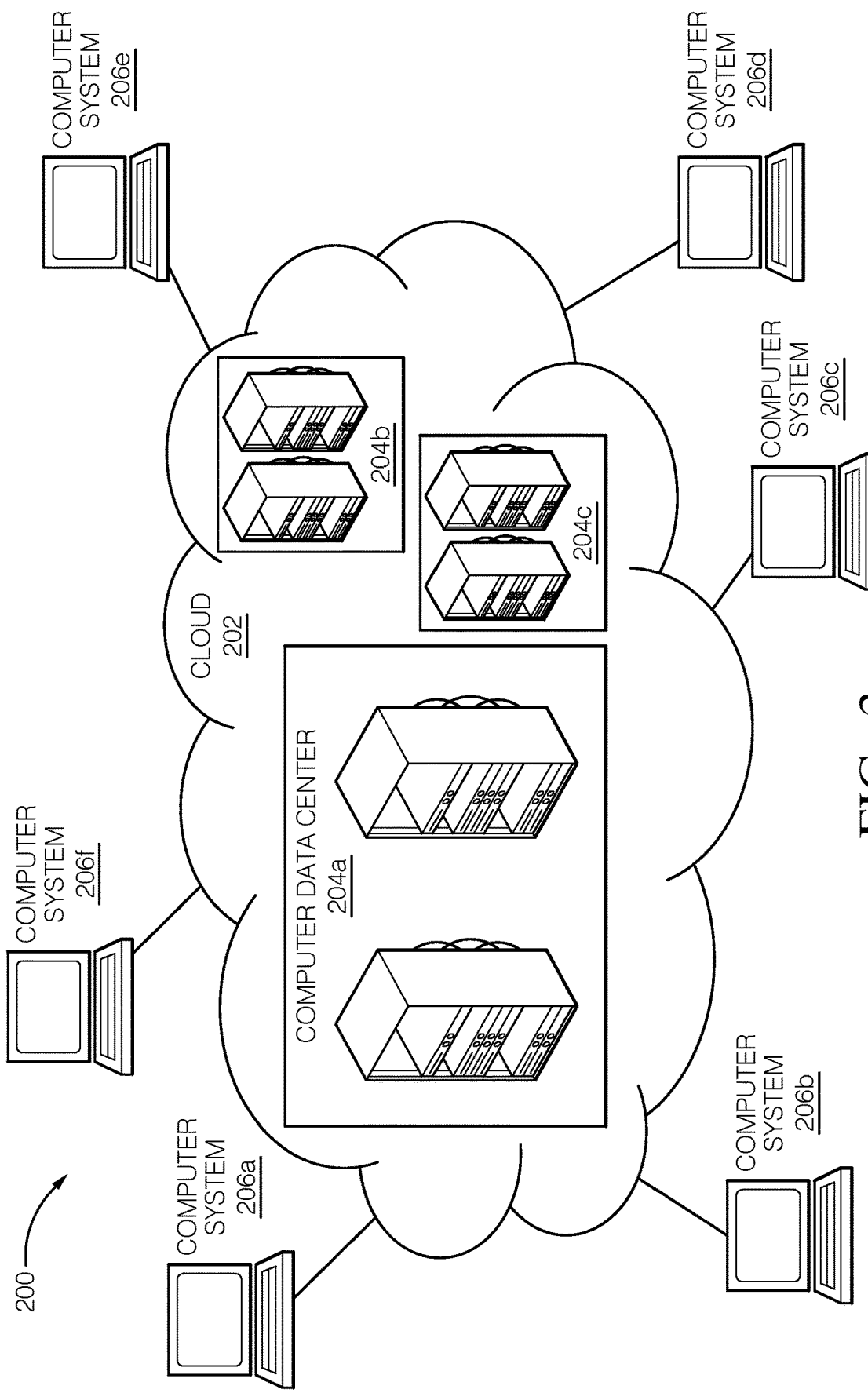
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
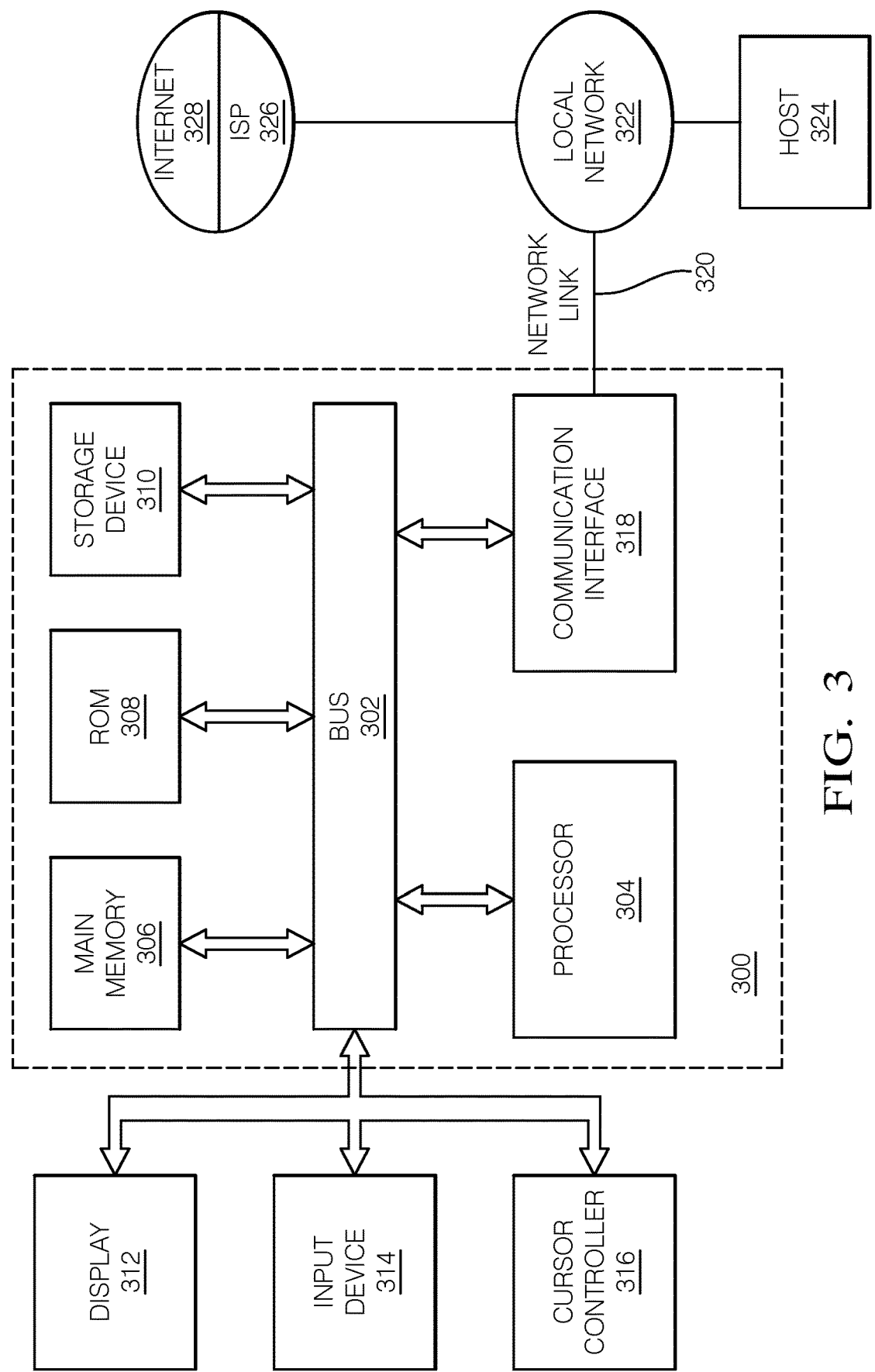
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
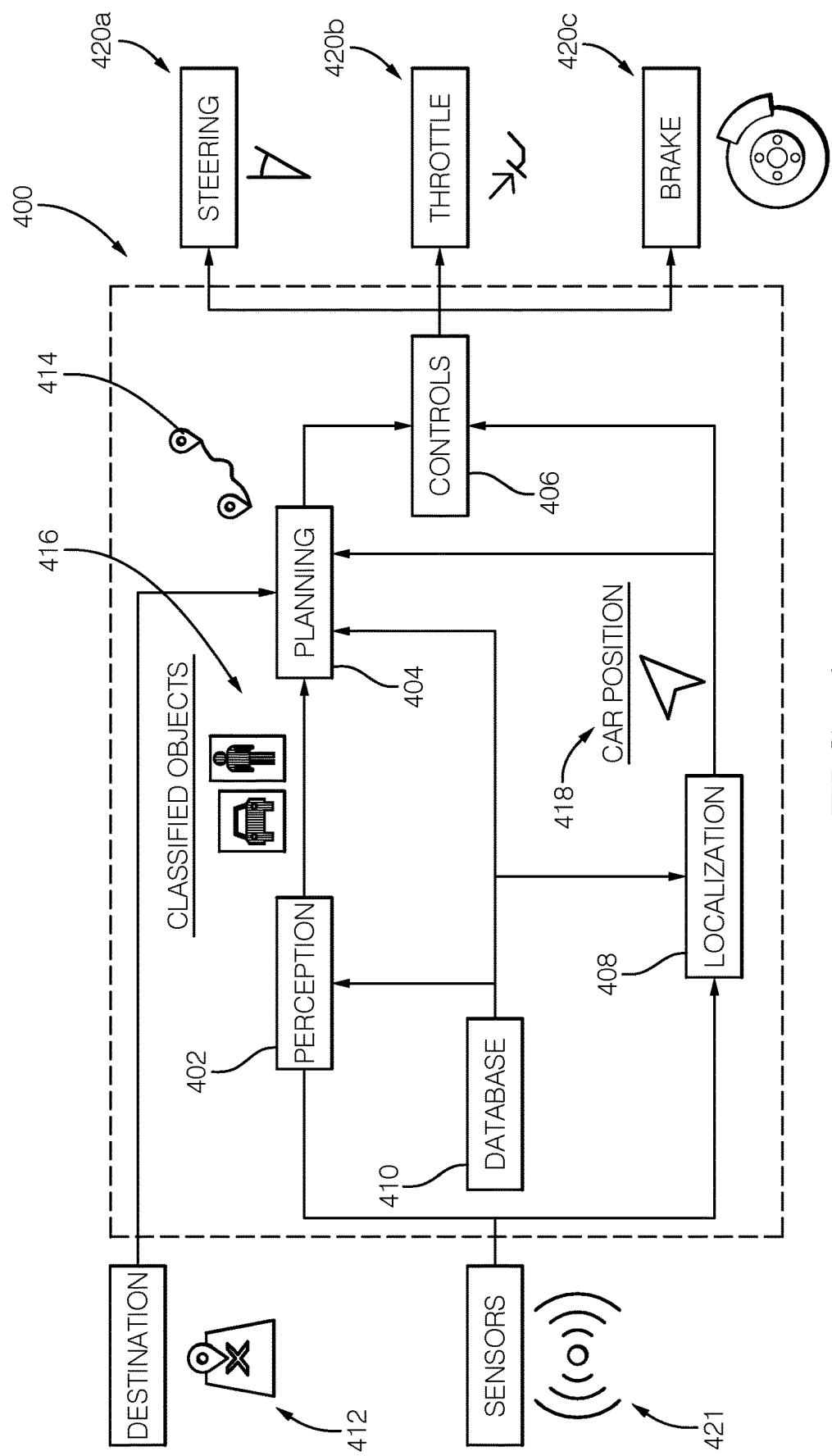
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
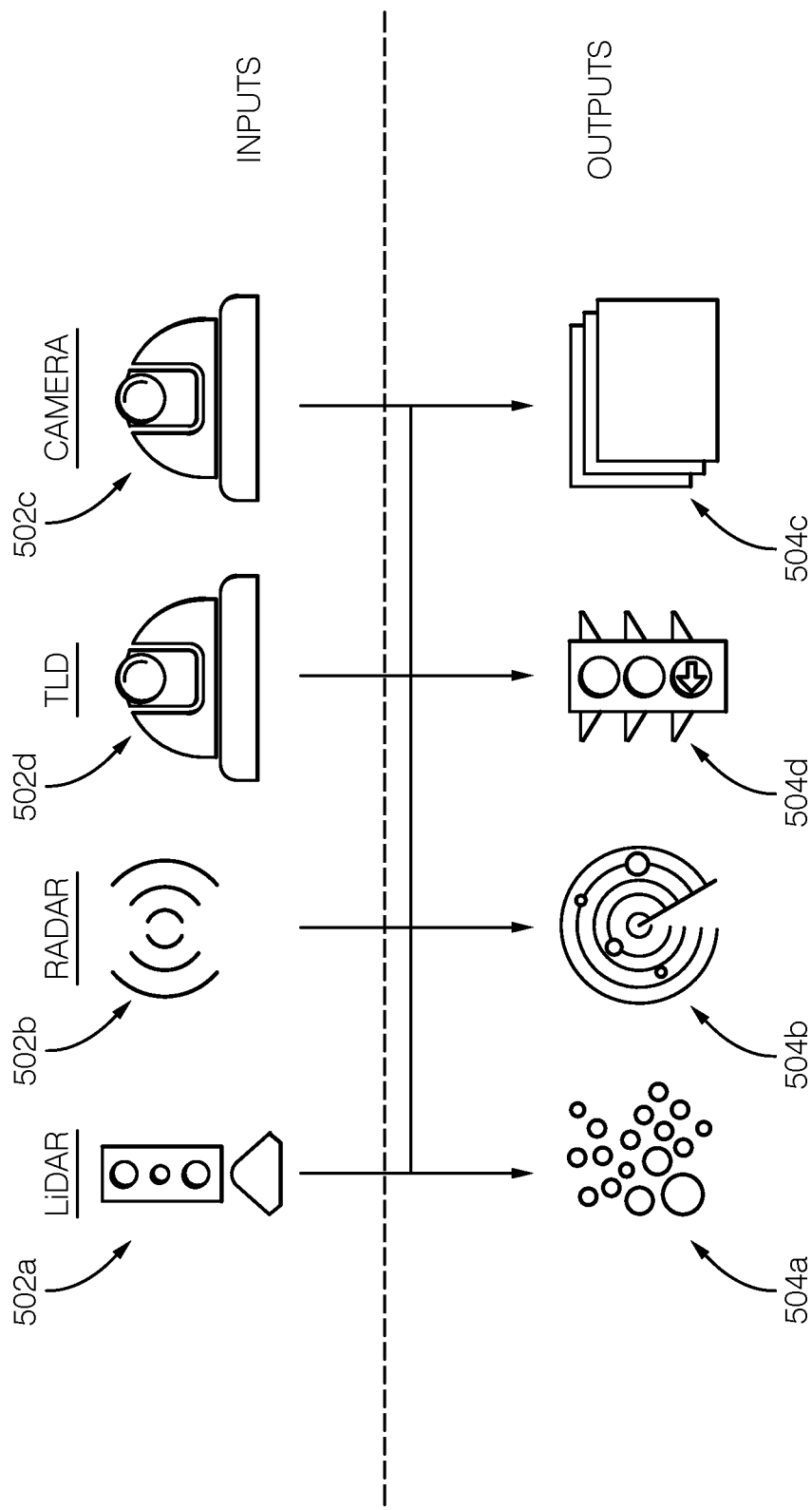
FIG. 5 shows an example of inputs and outputs that may be used by a perception module, in accordance with one or more embodiments.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
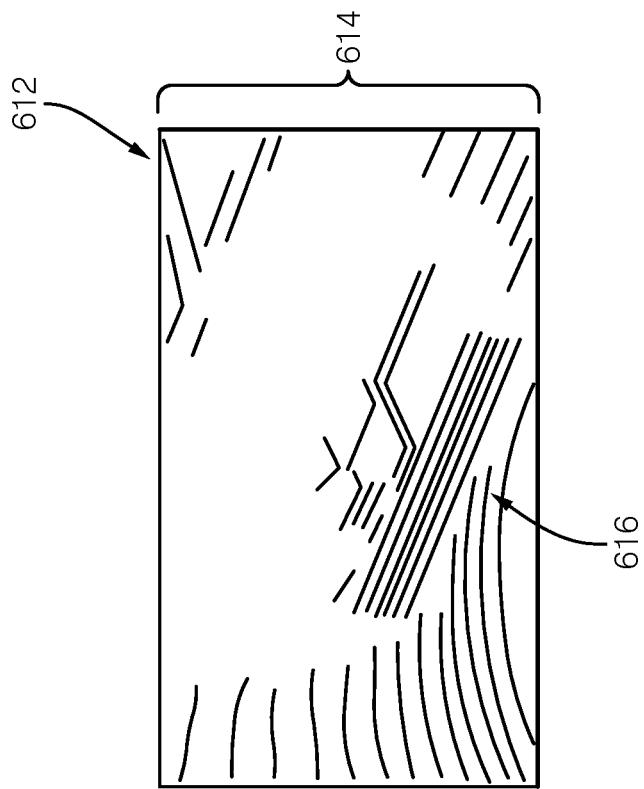
FIG. 6 shows an example of a LiDAR system, in accordance with one or more embodiments.
Figure 6:
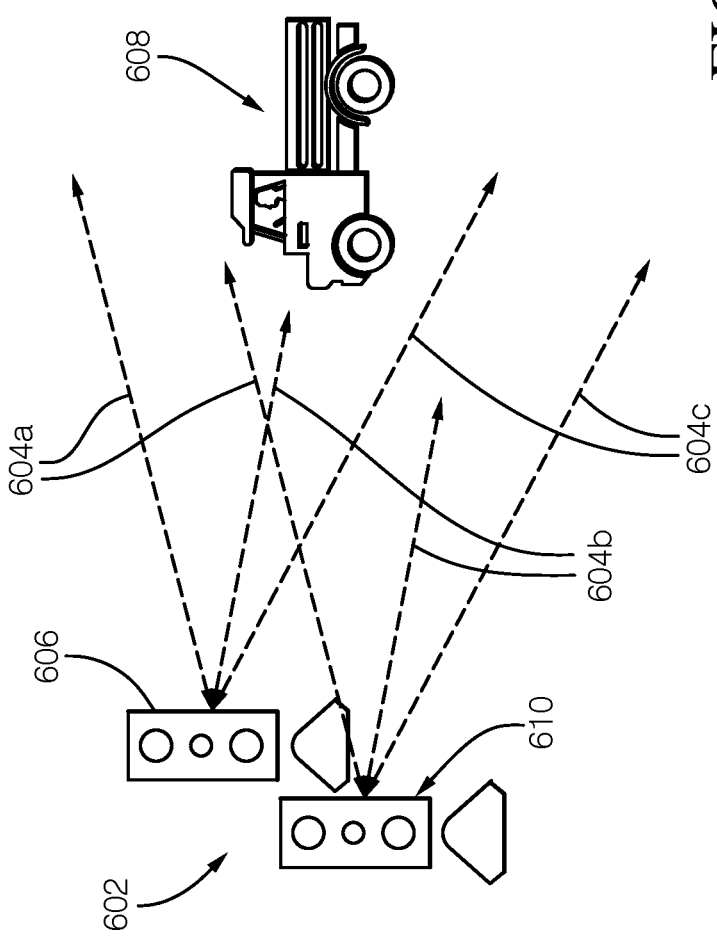

FIG. 6 shows an example of a LiDAR system 602 (e.g., the input 502a shown in FIG. 5). The LiDAR system 602 emits light 604a-c from light emitters 606, 610 (e.g., laser transmitters). Light emitted by a LiDAR system 602 is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors, which detect the reflected light. In an embodiment, one or more data processing systems associated with the LiDAR system generates an image 612 representing the field of view 614 of the LiDAR system 602. The image 612 includes information that represents the boundaries 616 of a physical object 608. In this way, the image 612 is used to determine the boundaries 616 of one or more physical objects near an AV. Note that in FIG. 6, the light transmitters 606, 610 are shown as pointing in the same general direction. In some embodiments, however, light transmitters 606, 610 point in different directions. That is, in some embodiment a single rotating LiDAR (e.g., mounted on the roof of the AV) can be used to create a 3D point cloud, and in other embodiments multiple LiDARs point in different directions and each produce a point cloud for a different direction. In the latter configuration, the points clouds from the multiple LiDARs are merged into a single, unstructured point 3D point cloud and processed as described in reference to FIGS. 13-17.

Figure 7:
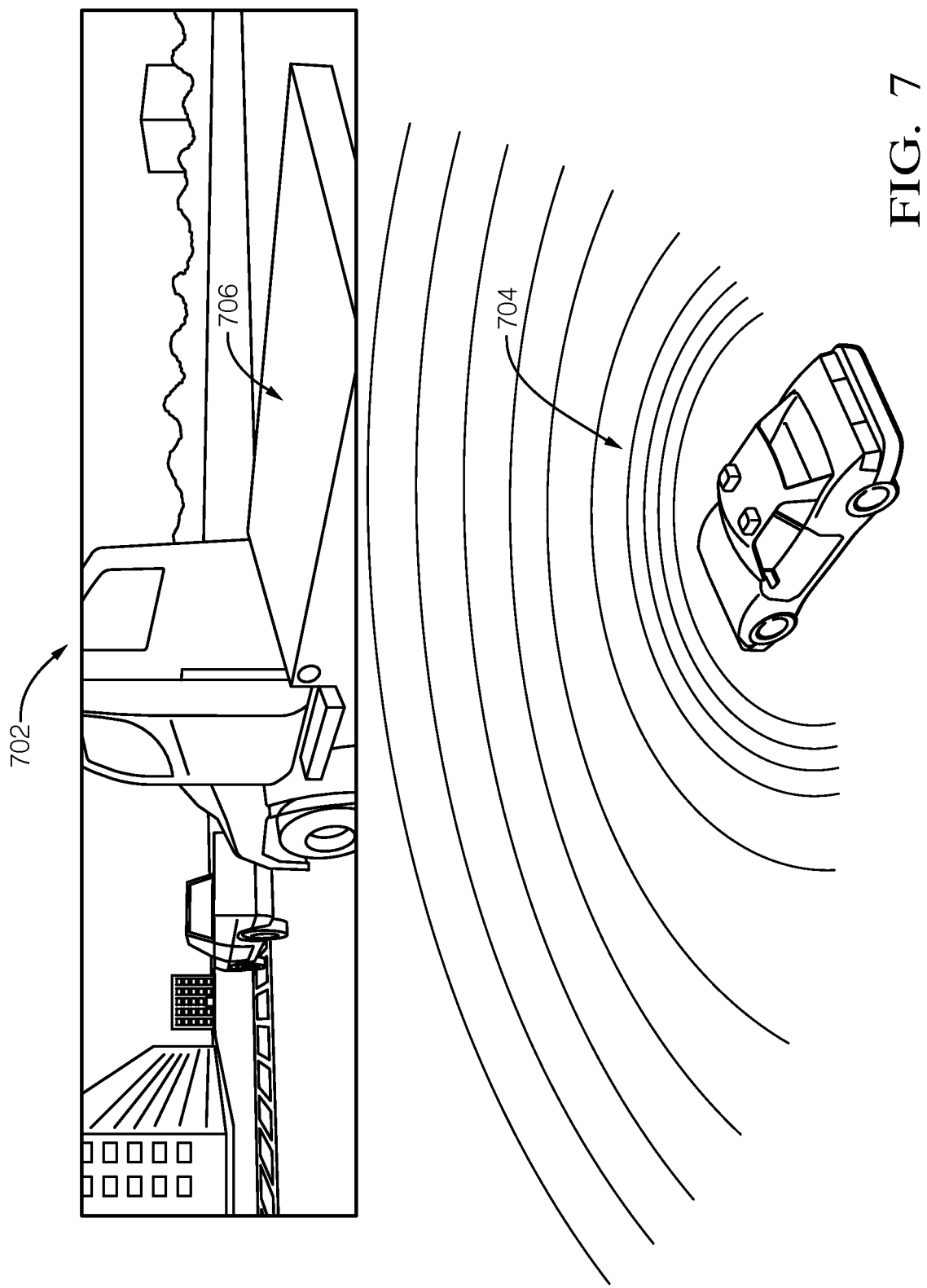
FIG. 7 shows the LiDAR system in operation, in accordance with one or more embodiments.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
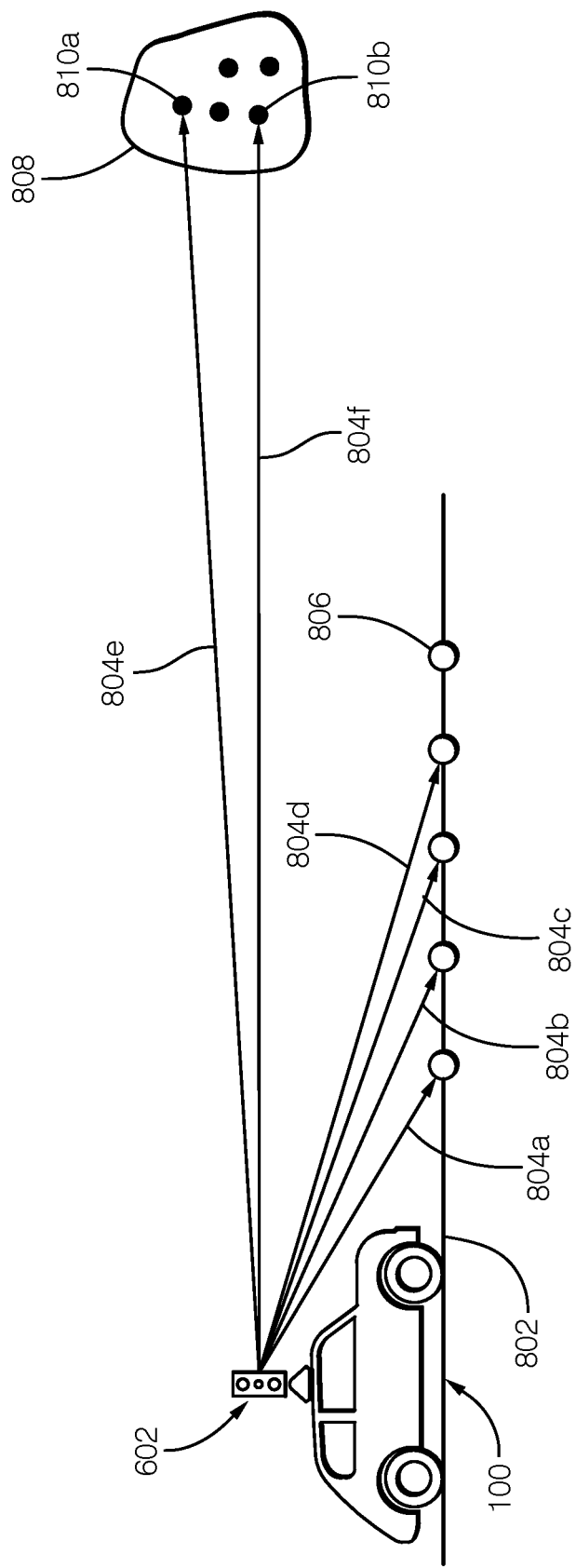
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

In an embodiment, the AV 100 includes multiple 3D laser range sensors (e.g., multiple fixed LiDARs) that provide point clouds that are merged into a single, unstructured point cloud.

Path Planning

Figure 9:
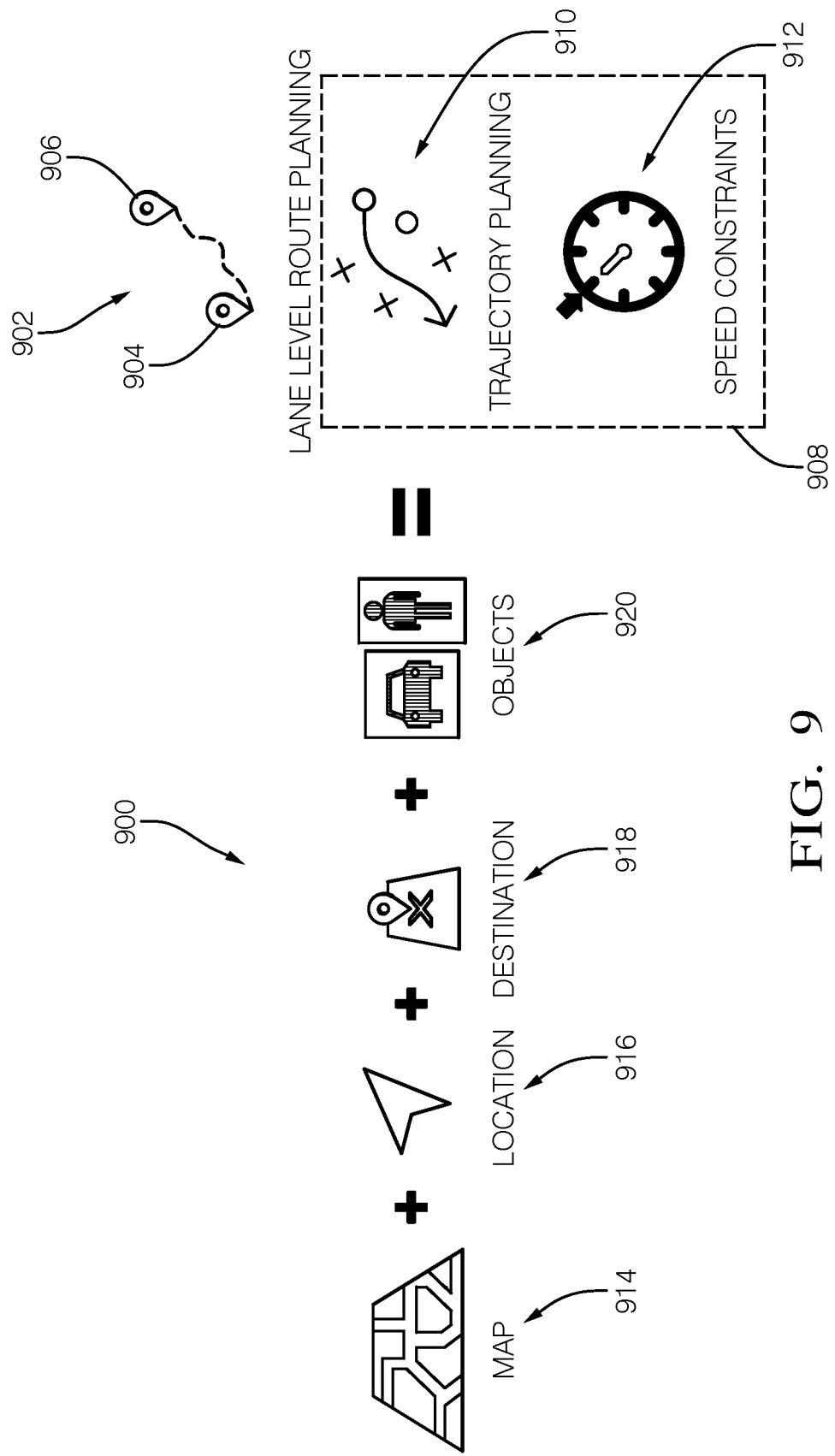
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
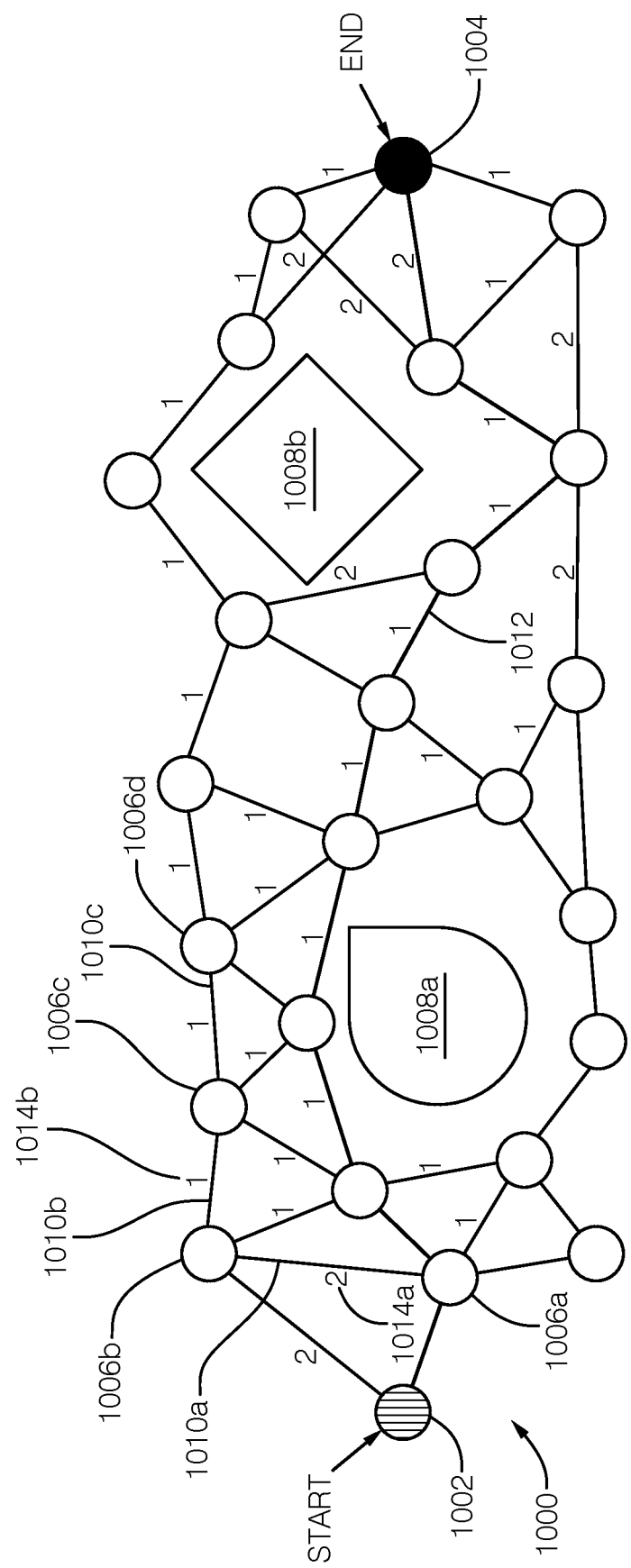
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
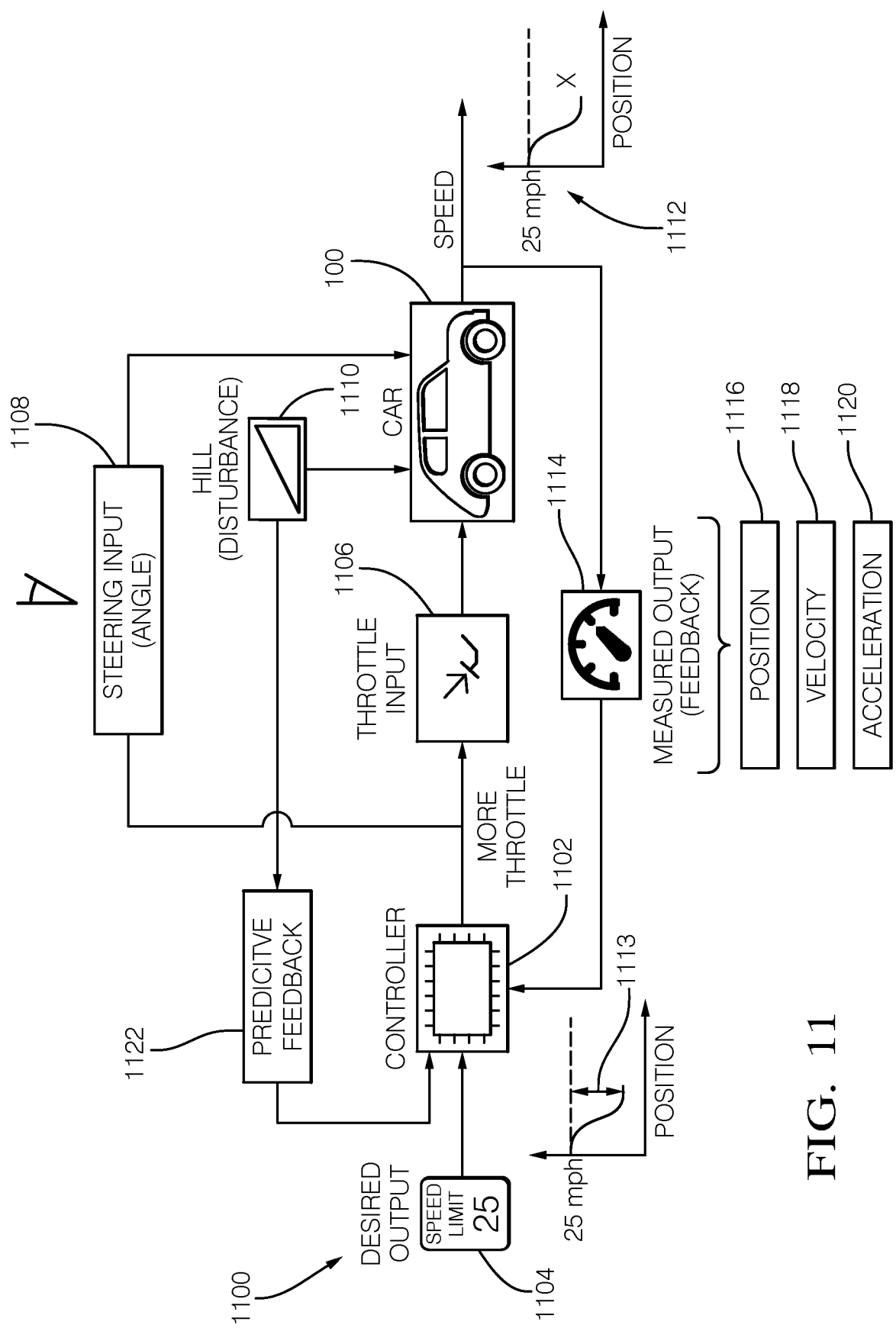
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
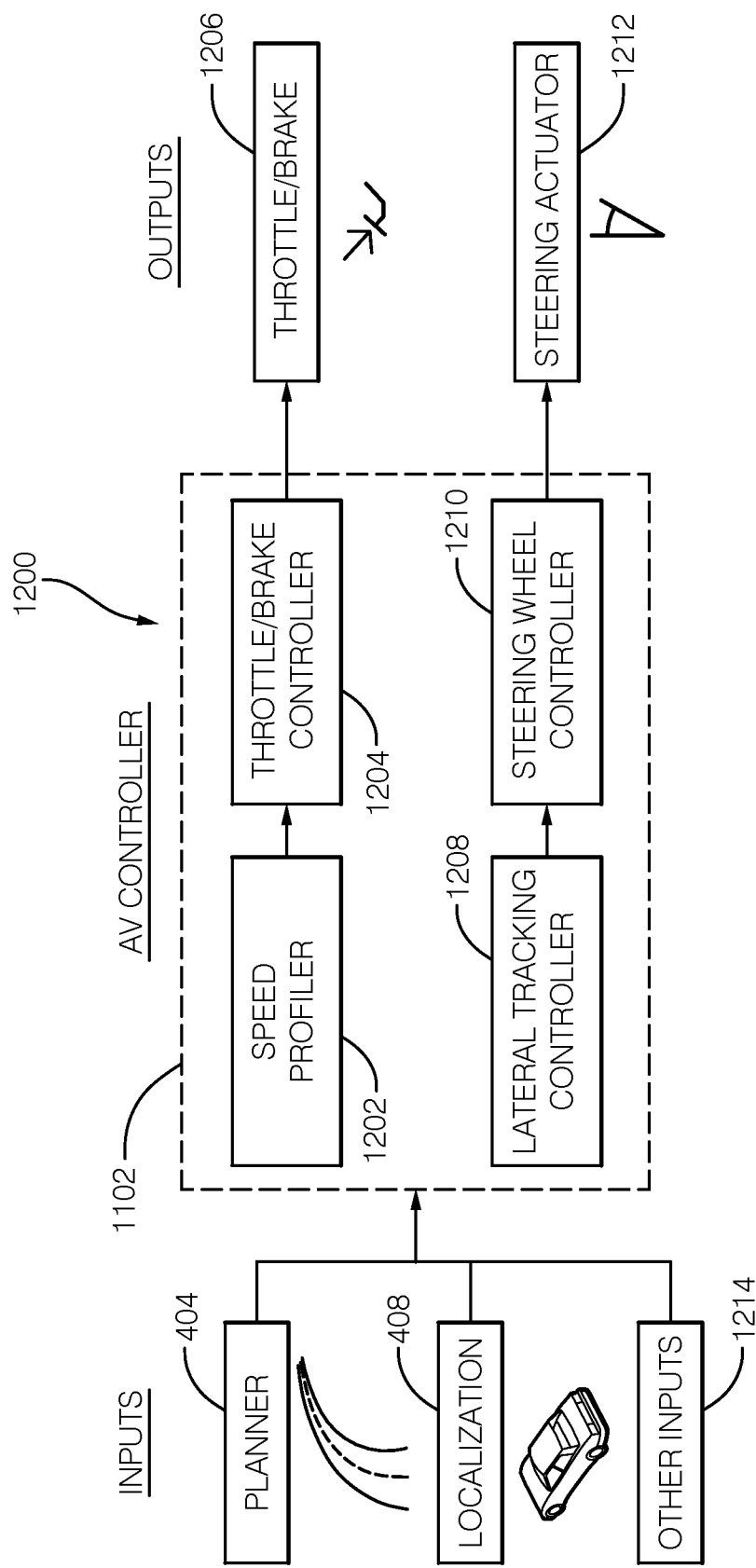
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Foreground Extraction Using Spatial Kalman Filter

Figure 13:
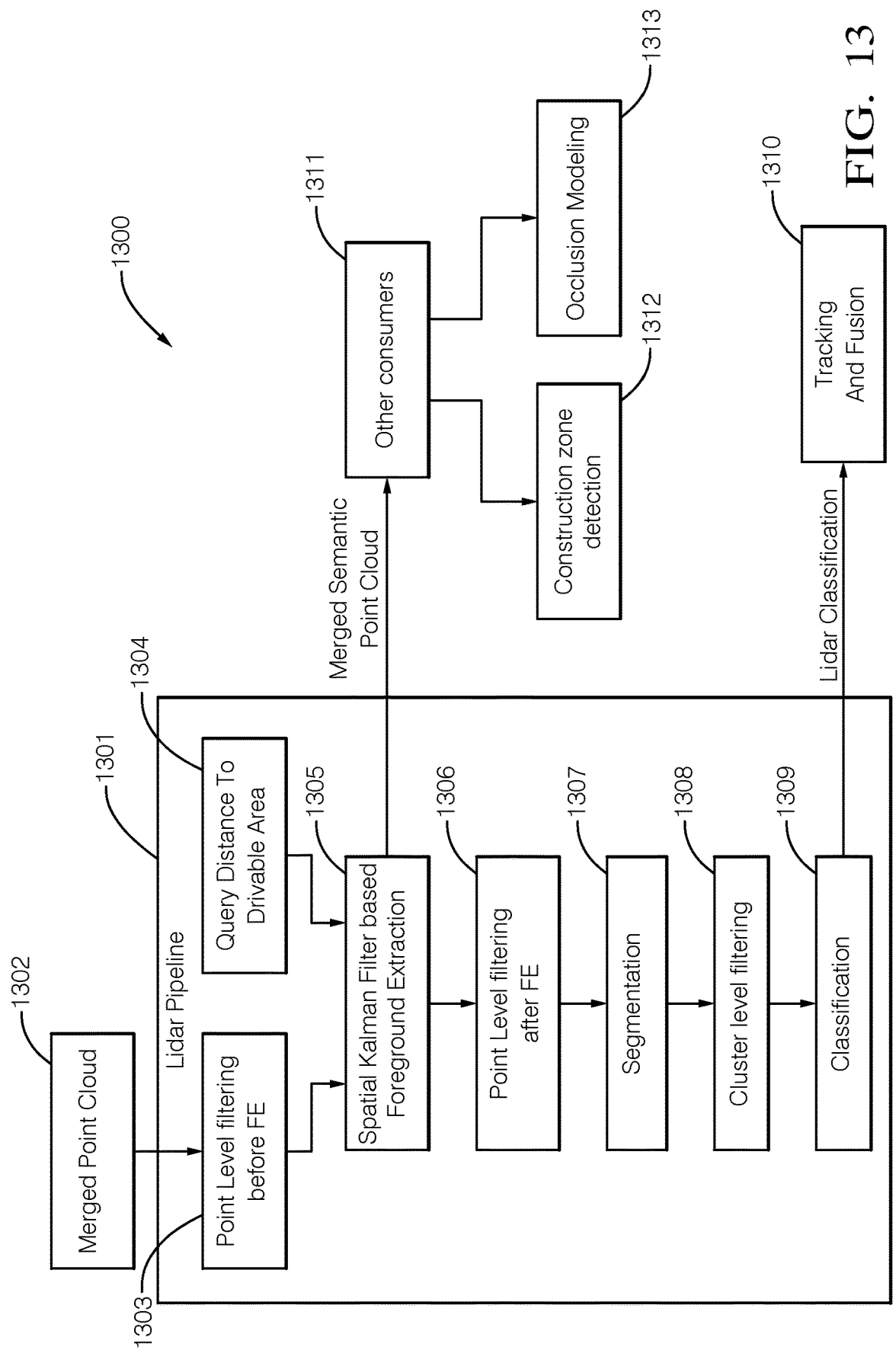
FIG. 13 is a block diagram of a LiDAR data processing pipeline that uses a spatial Kalman filter for foreground extraction, in accordance with one or more embodiments.

FIG. 13 is a block diagram of a LiDAR data processing pipeline 1300 that uses a spatial Kalman filter (SKF) for foreground extraction, in accordance with one or more embodiments. System 1300 includes pre-extraction point level filter 1303, SKF foreground extraction module 1305, post-extraction point level filter 1306, segmentation module 1307, cluster level filter 1308 and classifier module 1309.

Merged point cloud 1302 (including point clouds from multiple LiDARs) is input to perception pipeline 1300. In a first stage of pipeline 1300, the point cloud is "cleaned" using point-level filter 1303 before foreground extraction processing is applied to remove outlier points caused by limitations of the LiDAR sensor. Point-level filter 1303 looks for outlier points and filters or excludes the outlier points from further processing in pipeline 1300. Some example filters include but are not limited to: statistical-based, neighborhood-based, projection-based and PDEs-based filters, including but not limited to: voxel grid filter (VG), normal-based bilateral filter (NBF), moving least square (MLS), weighted locally optimal projection (WLOP), edge aware resample (EAR) and L0 minimization (L0).

Figure 14:
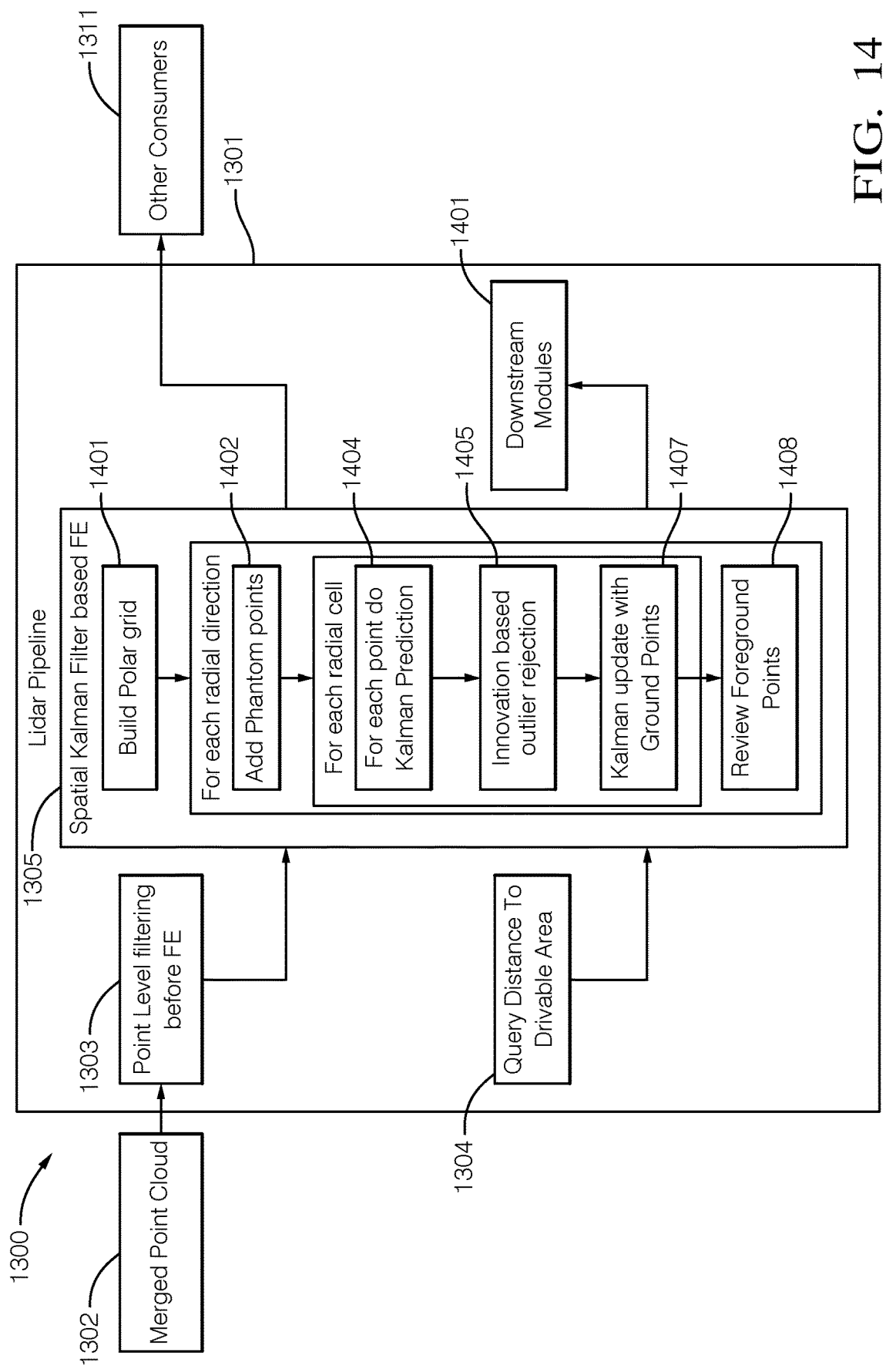
FIG. 14 is a block diagram of LiDAR data processing pipeline including processing for foreground extraction using a spatial Kalman filter, in accordance with one or more embodiments.

Next, the "cleaned" point cloud is input into foreground extraction (FE) module 1305, which labels the points as either foreground or background using a process described in reference to FIG. 14. The output of FE module 1305 is a merged point cloud with points that are labeled as either foreground or background (hereinafter referred to as "merged semantic point cloud"). The points labeled as foreground are then input into segmentation module 1307, which generates N clusters resembling objects to be classified in subsequent processing. The clusters are input to the cluster level filtering module 1308 which looks at the features of each cluster and performs filtering based on these features. Features include but are not limited to: physical/spatial size, number of points, temporal consistency, histogram filters on the points within the clusters, etc. The filtered clusters are then input into classifier 1309, which classifies the clusters and gives each cluster a label (e.g., car, pedestrian, bicycle, generic object).

The resulting classified objects are input into tracking and fusion module 1310 which fuses the LiDAR classified objects with classified objects from other perception processing pipelines that use other types of sensors (e.g., camera, RADAR), and initiates or updates a multi-object tracking algorithm that tracks multiple objects concurrently (e.g., a bank of linear Kalman filters). The tracked objects can then be used by downstream clients to perform other tasks, such as planning, routing and collision avoidance. Additionally, the merged semantic point cloud can be sent to other data consumers 1311 for use in other applications, including but not limited to construction zone detection 1312 and occlusion modeling 1313.

The processing pipeline 1300 described above is one example of a processing pipeline for merged LiDAR point clouds. Other processing pipelines and systems may also benefit from the foreground extraction module 1305, which will now be described in reference to FIG. 14.

Figure 15:
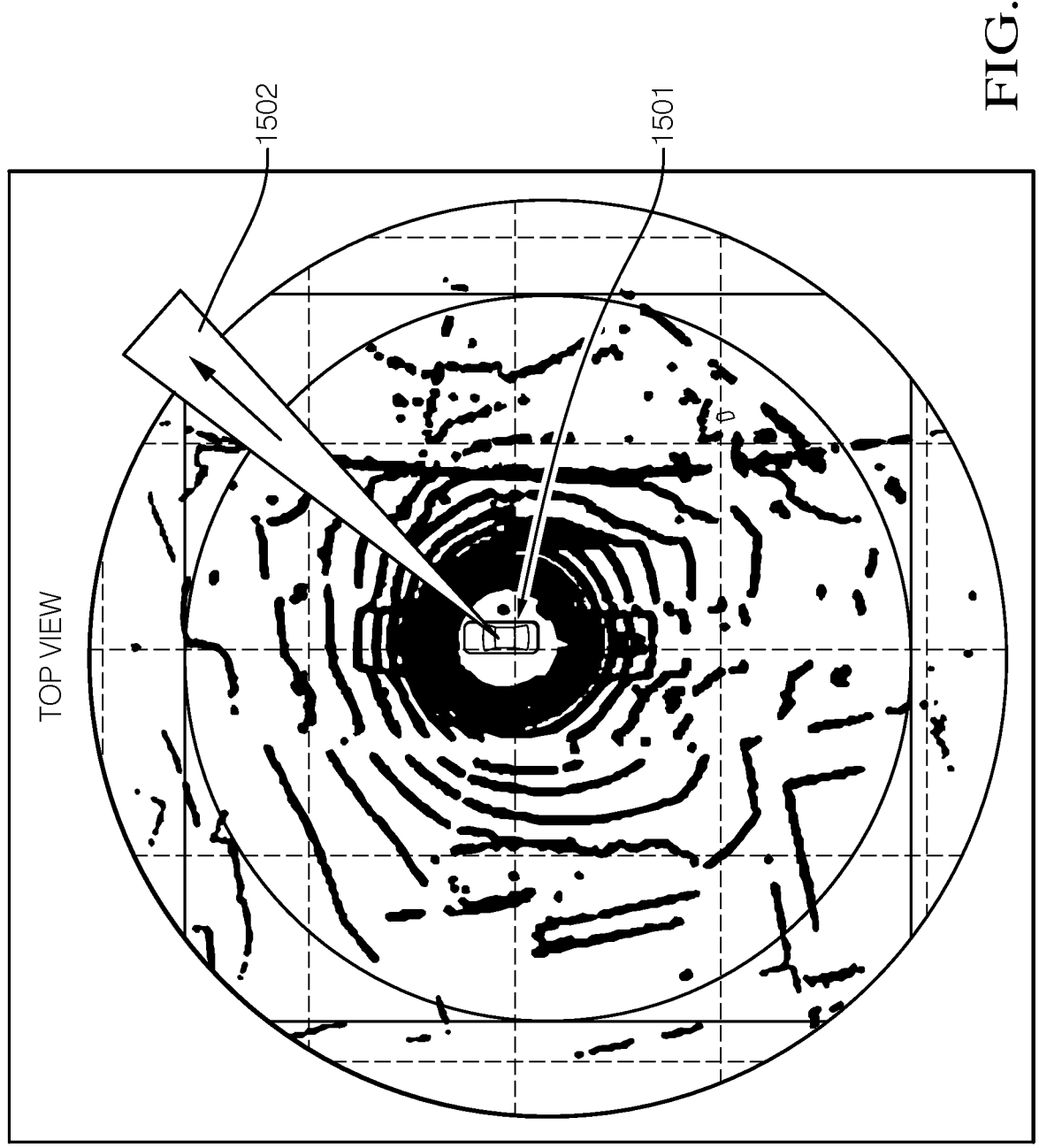
FIG. 15 illustrates a 2D polar grid for processing a LiDAR point cloud, in accordance with one more embodiments.

FIG. 14 is a block diagram of LiDAR data processing pipeline including processing for foreground extraction using a spatial Kalman filter (SKF), in accordance with one or more embodiments. The filtered point cloud is projected into a 2D polar grid (1401). In FIG. 15, a 2D polar grid 1500 is shown with an exemplary radial cell 1502 which originates from vehicle 1501.

In an embodiment, for each radial direction phantom points are added to the 2D polar grid cells near the vicinity of the vehicle (1402). For each point in each radial cell, a SKF prediction step is performed (1404) based on a constant slope model that assumes the slope of the terrain changes slowly. The points are processed in order based on their respective distances from the LiDAR sensor, where the nearest point is processed first and the farthest point is processed last. Also, the points are processed in order based on their respective heights, where the lowest point is processed first and the highest point is processed last. The method models the zero order and first order terrain height, i.e., the height of a LiDAR point hitting the terrain and the slope of the terrain at the location of the point. The location of each point measurement in the 2D polar grid is denoted with a radial distance rho (r) and height z.

In an embodiment, the state space x and state transition matrix A of the SKF are shown below, where $\Delta_r$ is the rho difference between the current point and the previous point:

$$x_k = \begin{bmatrix} h_k \\ h'_k \end{bmatrix}, \quad [1]$$

$$A = \begin{bmatrix} 1 & \Delta_r \\ 0 & 1 \end{bmatrix}. \quad [2]$$

The measurement z and measurement matrix H are shown below, where $z'_k$ is the slope at the location of the point, calculated as $$z'_k = \frac{\Delta_z}{\Delta_r} :$$

$$z_k = \begin{bmatrix} z_k \\ z'_k \end{bmatrix}, \quad [3]$$

$$H = \begin{bmatrix} 1 & 0 \\ 0 & 1 \end{bmatrix}. \quad [4]$$

The SKF prediction step is given by:

$$x_k^- = A x_{k-1},$$

$$P_k^- = A P_{k-1} A^T + Q.$$

where $P_k^-$ is the prediction error covariance matrix and Q is the process noise covariance matrix.

The process noise covariance matrix Q represents how much the terrain can change. A typical constant-slope first order model is used, for which the process noise is defined as shown below, assuming that the slope change belongs to a Gaussian noise distribution $N(0, \sigma_{h''})$:

$$Q = \begin{bmatrix} \frac{\Delta_r^4}{4} & \frac{\Delta_r^3}{2} \\ \frac{\Delta_r^3}{2} & \Delta_r^2 \end{bmatrix} * \sigma_{h''}^2.$$

To derive the process noise matrix Q we assume the terrain undergoes a slope change (h", similar to the concept of acceleration) that is distributed according to a Gaussian distribution $N(0, \sigma_{h''})$. The effect of the slope change to the state is $x_k = A x_{k-1} + w_k$, where the process noise $w_k = G a_k$, where $a_k \sim N(0, \sigma_{h''})$. This gives:

$$\begin{aligned} \text{var}(w_k) &= \mathbb{E}(w_k w_k^T) - \mathbb{E}(w_k) \mathbb{E}(w_k)^T \\ &= \mathbb{E}(w_k w_k^T) \\ &= \mathbb{E}(G a_k a_k^T G^T) \\ &= G \mathbb{E}(a_k a_k^T) G^T \\ &= G(\text{Cov}(a_k) + \mathbb{E}(a_k) \mathbb{E}(a_k)^T) G^T \\ &= G \sigma_{h''}^2 G^T \\ &= G G^T \sigma_{h''}^2 \end{aligned}$$

Note that $$G = \begin{bmatrix} \frac{\Delta_r^2}{2}, \Delta_r \end{bmatrix}^T,$$

hence $$Q_k = \text{var}(w_k) = GG^T \sigma_{h''}^2 = \begin{bmatrix} \frac{\Delta_r^4}{4} & \frac{\Delta_r^3}{2} \\ \frac{\Delta_r^3}{2} & \Delta_r^2 \end{bmatrix} * \sigma_{h''}^2.$$

Note that the design of $Q_k$ handles occlusion explicitly. Image that a slope is occluded by a car, there will be a large empty space before the lidars hit the first point of the terrain, and that point will be quite high. In that case, the large empty space will lead to a large $\Delta_r$ and $Q_k$. Therefore we allow the filter to adapt to the slope quickly.

Returning again to FIG. 14, after the SKF prediction an innovation based outlier rejection is performed (1405). The SKF operates under the assumption of Gaussian noise. Note that here, the "noise" is the foreground points. Obviously the foreground points do not belong to a Gaussian distribution. To alleviate this problem, another outlier rejection mechanism is proposed so that the foreground points that go into the Kalman update step are roughly Gaussian. The outlier rejection is based on the innovation and is integrated into SKF formulation and performed after the SKF prediction step.

In an embodiment, the innovation is the difference between the SKF prediction and the actual measurement, as shown below:

$$y_k = z_k - Hx_k^- = z_k - x_k^- = \begin{bmatrix} z_k - h_k \\ z_k' - h_k' \end{bmatrix},$$

and the innovation covariance is given by:

$$S_k = H_k P_k^- H_k^T + R_k = P_k^- + R_k$$

The innovation-based outlier rejection includes a height-check and a gradient-check. A point is rejected by setting a threshold for the height difference and the slope difference based on the innovation covariance $S_k$ (e.g., 99% confidence). For the height-check, a height difference threshold is set to $3\sqrt{S_k(0,0)}$ that is at a 99% confidence according to $S_k$. A point will be rejected if its height difference to the estimated height, $h_k$, is larger than the threshold. Similarly, for gradient-check, a slope difference threshold is set to $3\sqrt{S_k(1,1)}$, to reject points whose slope differs from estimated slope, $h'_k$, by more than the threshold. In an embodiment, an additional value can be added to the innovation covariance threshold to account for sensor calibration error (e.g., LiDAR calibration error). In another embodiment, the state vector can be augmented to include one or more calibration errors (e.g., bias and drift errors) as additional state(s) so that calibration error(s) can be predicted using the SKF and added to the innovation covariance threshold In the innovation covariance equation above $R_k$ is a measurement noise covariance matrix. The measurement noise covariance matrix $R_k$ is derived to account for roadside curb height, such that $\sigma_z = 0.3$, $\text{Cov}(z,z) = \sigma_z^2$, where 0.3 m is the maximum height of the curb. $\text{Cov}(z', z')$ can be derived as shown below:

$$z_k' = \frac{z_k - z_{k-1}}{\Delta_r},$$

$$\text{Cov}(z', z') \equiv \text{Cov}(z_k') = \frac{\text{Cov}(z_k) + \text{Cov}(z_{k-1})}{\Delta_r^2} = \frac{2\sigma_z^2}{\Delta_r^2}.$$

Similarly, $\text{Cov}(z, z')$ can be derived as below, noting the assumption $z_k \sim N(x_k, \sigma_z^2)$ and $z_{k-1}$ are independent and identically distributed (iid) and the assumption that the vehicle is on a flat surface (the slope is 0, $\mathbb{E}(z'_k) = 0$, i.e., the points line on a flat surface), and the property $\text{Cov}(X,Y) = \mathbb{E}(XY) - \mathbb{E}(X)\mathbb{E}(Y)$:

$$\begin{aligned}
\text{Cov}(z, z') &\equiv \text{Cov}(z_k, z_k') \\
&= \mathbb{E}(z_k z_k') - \mathbb{E}(z_k)\mathbb{E}(z_k') \\
&= \mathbb{E}(z_k z_k') \\
&= \mathbb{E}\left(z_k \frac{z_k - z_{k-1}}{\Delta_r}\right) \\
&= \frac{1}{\Delta_r}(\mathbb{E}(z_k z_k) - \mathbb{E}(z_k z_{k-1})) \\
&= \frac{1}{\Delta_r}((\text{Cov}(z_k) + \mathbb{E}(z_k)^2) - (\text{Cov}(z_k, z_{k-1}) + \mathbb{E}(z_k)\mathbb{E}(z_{k-1}))) \\
&= \frac{1}{\Delta_r}\text{Cov}(z_k) \\
&= \frac{1}{\Delta_r}\sigma_z^2
\end{aligned}$$

Finally, we get the measurement noise covariance matrix $R_k$:

$$R = \begin{bmatrix} \text{Cov}(z,z) & \text{Cov}(z,z') \\ \text{Cov}(z,z') & \text{Cov}(z',z') \end{bmatrix} = \begin{bmatrix} \sigma_z^2 & \frac{\sigma_z^2}{\Delta_r} \\ \frac{\sigma_z^2}{\Delta_r} & \frac{2\sigma_z^2}{\Delta_r^2} \end{bmatrix}$$

Returning again to FIG. 14, after the innovation-based outlier rejection 1405 is performed, the SKF update step is performed using the ground points (1407), wherein the ground points are the points that survive the innovation-based and gradient based threshold tests, which identifies foreground points as outliers. The SKF update step is performed as follows where $K_k$ is the Kalman gain matrix, $x_k$ is the updated state and $P_k$ is the updated error covariance matrix:

$$K_k = P_k^- H^T (HP_k^- H^T + R_k)^{-1} = P_k^- (P_k^- + R_k)^{-1}$$

$$x_k = x_k^- K_k(z_k - Hx_k^-) = x_k^- + K_k(z_k - x_k^-)$$

$$P_k = (I - K_k H) P_k^- = (I - K_k) P_k^-.$$

Because of the design of the measurement noise covariance matrix it is possible for a roadside curb to be mislabeled as a foreground point. Returning again to FIG. 14, after the SKF update step (1407) is performed the foreground points are reviewed 1408 to determine if any of the foreground points are roadside curb and discard those points by relabeling the points as ground points. In an embodiment, the height of each foreground point detected by the innovation-based threshold check is compared to neighboring foreground points to determine if the foreground point is higher or lower than the other foreground points by a threshold value (e.g., 20 cm). A foreground point will only be kept if it has neighboring foreground points within a specified radius and height difference. If the radius or height to the nearest neighboring foreground point is larger than a set threshold, the foreground point is deemed a ground point and will be relabeled as a ground point. Note that the foreground point review is only conducted for foreground points that pass the height innovation check but fails the gradient check. Additionally, foreground point review is designed to address two problems: (i) the road curb problem described above, and (ii) possible calibration errors between the LiDARs used to construct the merged point cloud.

In sum, a foreground extraction system has been disclosed that employs surface fitting using a SKF. A 2D polar grid is built and filtered LiDAR points are projected into the 2D grid. The points in each radial cell of the 2D grid are sorted according to distance and height, such that closer and lower points are processed first. The SKF predicts the height of each point and the terrain using a process noise covariance matrix that models changing terrain and a measurement covariance noise matrix that models roadside curb heights. The elements of the process noise covariance matrix and the measurement noise matrix are summed together to create an innovation covariance which is compared to a statistically adaptive threshold value for height and slope/gradient to determine if a particular point is foreground or ground. The ground points are then used to update the SKF and the foreground points are reviewed to identify roadside curbs. Any mislabeled points are then relabeled as ground points. The approach is purely geometric based and does not make any use of semantic information nor temporal information. The output of feature extraction module 1305 (foreground/ground points) are sent to downstream modules 1401 or other consumers 1311 for various applications (e.g., planning, construction zone detection, occlusion modeling, etc.).

Figure 16:
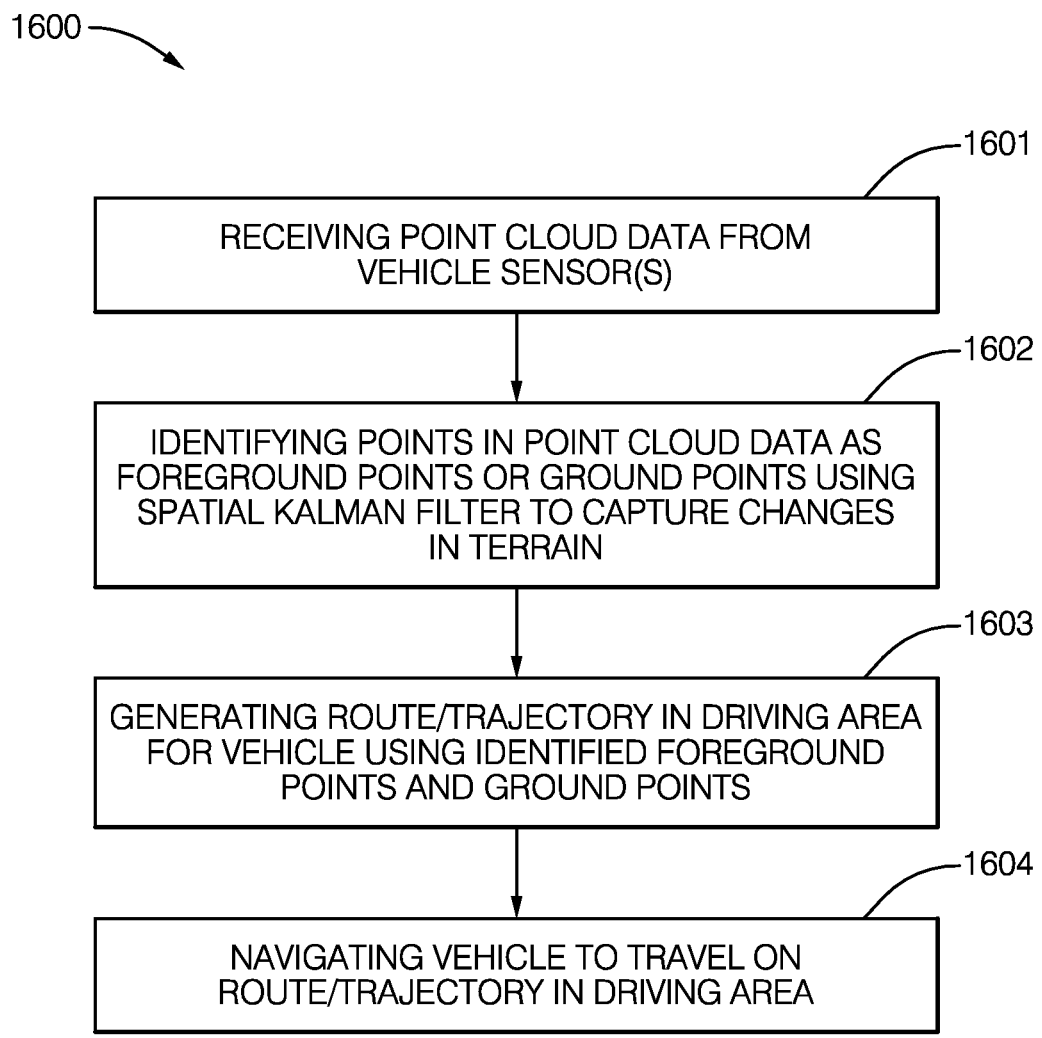
FIG. 16 is a flow diagram of a general process of foreground extraction using a spatial Kalman filter, in accordance with one or more embodiments

FIG. 16 is a flow diagram of a general process 1600 of foreground extraction using a spatial Kalman filter, in accordance with one or more embodiments. Process 1600 can be implemented using, for example, the computer system 300 described in reference to FIG. 3.

Process 1600 begins by receiving a point cloud from one or more vehicle sensors (1601). For example, point clouds from multiple LiDAR sensors can be merged into a single merged point cloud and input into a perception processing pipeline, such as pipeline 1300 described in reference to FIG. 13.

Process 1600 continues by identifying points in the point cloud as foreground points or ground points using SKF configured to model changes in the terrain (1602), such as changes in the height and slope of the terrain, as described in reference to FIG. 14.

Process 1600 continues by generating a route or trajectory in a driving area for a vehicle using the identified foreground points and ground points (1603), and then using a vehicle controller (see FIG. 11) to control the vehicle while the vehicle is traveling the route or trajectory in the driving area (1604). For example, the identified foreground points and ground points can be used by downstream elements in the perception pipeline (see, e.g., FIG. 4), such as a semantic segmentation process, construction zone detection and occlusion modeling, as shown in FIG. 13. Foreground objects that are detected by the perception pipeline (e.g., pedestrian, car, bicyclist) can be used by a planning module to generate a plan or trajectory for the vehicle that will avoid a collision with the foreground objects, such as the planning module described in reference to FIG. 9.

Figure 17:
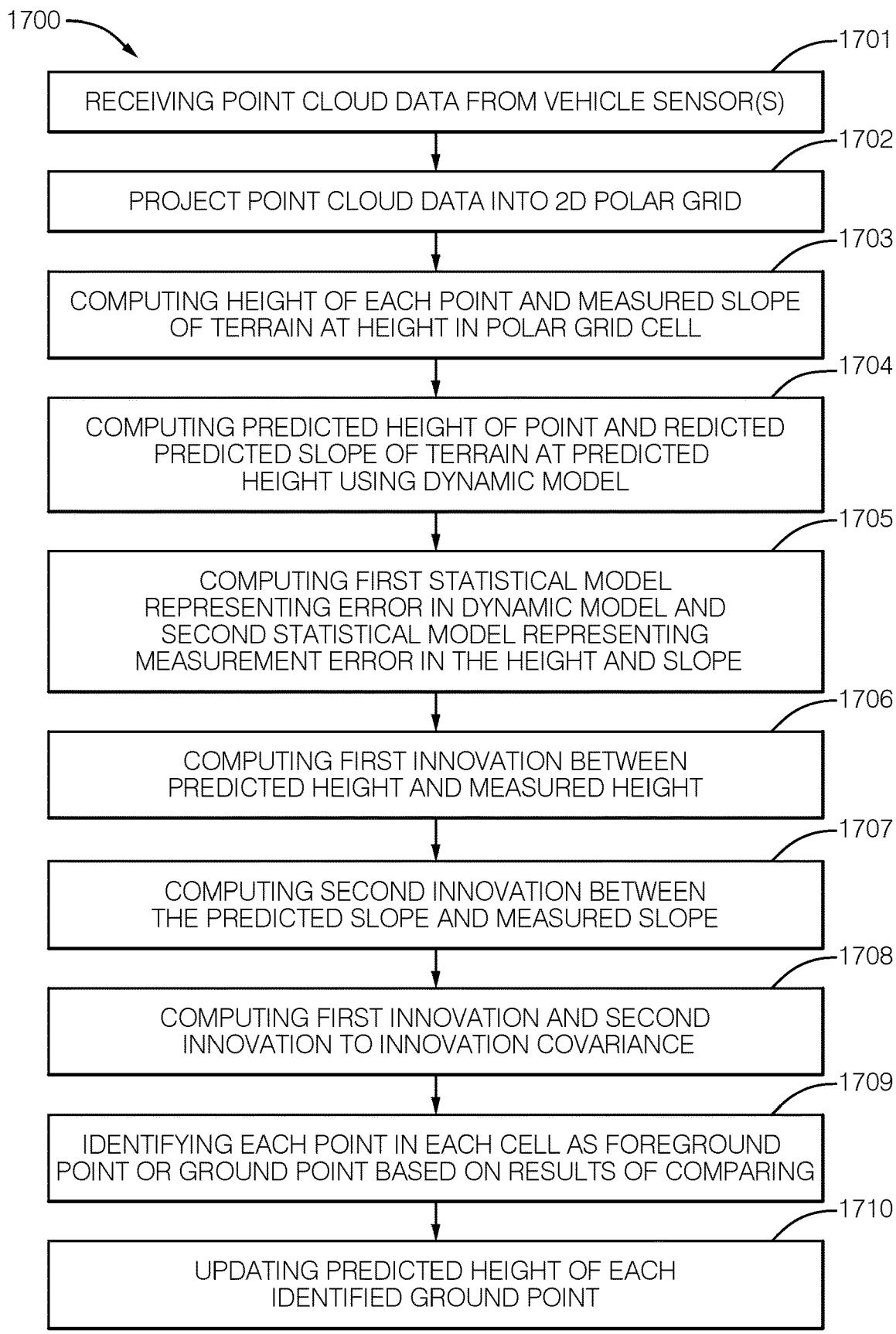
FIG. 17 is a more detailed flow diagram of the process of foreground extraction using a spatial Kalman filter, in accordance with one or more embodiments.

FIG. 17 is a more detailed flow diagram of the process of foreground extraction using a spatial Kalman filter, in accordance with one or more embodiments.

Process 1700 begins by receiving a point cloud from one or more vehicle sensors (1701). For example, point clouds from multiple LiDAR sensors can be merged into a single merged point cloud and input into a perception processing pipeline, such as pipeline 1300 described in reference to FIG. 13.

Process 1700 continues by projecting the point cloud into a 2D polar grid (1702) where the location of each point in the 2D polar grid is denoted with a radial distance rho (r) and measured height z.

Process 1700 continues by computing the height z of each point and the slope z' of the terrain at the height z in the 2D polar grid (1703). The slope z' is computed from a current and previous point location, as $$z'_k = \frac{\Delta_z}{\Delta_r}.$$

Process 1700 continues by computing a predicted height of the point and predicted slope of the terrain at the location of the point using a SKF (1704), as described in reference to FIG. 14.

Process 1700 continues by computing a first statistical model representing error in the dynamic model and a second statistical model representing measurement error in the height and slope (1705). For example, the first statistical model is a process noise covariance that models terrain changes and the second statistical model is a measurement noise covariance that models roadside curb height.

Process 1700 continues by computing a first innovation between the predicted height and the measured height (1706), and a second innovation between the predicted slope and the measured slope (1707), comparing the first innovation and the second innovation to an innovation covariance (1708) and identifying each point in each cell as foreground or ground based on a result of the comparing (1709). The height innovation and the slope innovation are each compared to the innovation covariance. If one of height and the slope innovations exceed the innovation covariance, the point is deemed a foreground point. In another embodiment, if both the height and the slope innovations exceed the innovation covariance, the point is deemed a foreground point.

Process 1700 continues by updating the predicted height of each identified ground point using the SKF (1710) as described in reference to FIG. 14.

Process 1700 continues by comparing each foreground point with neighboring foreground points to ensure that only foreground points are kept if at least one neighboring foreground point exists within a given radius and height difference. If no other nearby foreground point is present, the foreground point is deemed a ground point (e.g., a roadside curb) and is relabeled as a ground point.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

The invention claimed is:

1. A method comprising:
receiving, using one or more processors of a vehicle, data comprising multi-dimensional points from one or more sensors of the vehicle;
identifying, using the one or more processors, points within the multi-dimensional points as foreground points or ground points using a filter;
generating a trajectory in a driving area for the vehicle using the identified foreground points and ground points; and
controlling, using a vehicle controller, the vehicle while the vehicle is traveling on the trajectory in the driving area;
the method further comprising:
transforming, using the one or more processors, the data into a grid comprising a plurality of cells;
for each point in at least one cell of the plurality of cells:
computing, using the one or more processors, a measured height of the point and a measured slope of terrain at the measured height in the grid;
computing, using the one or more processors, a predicted height of the point and a predicted slope of the terrain at the predicted height using a dynamic model;
computing, using the one or more processors, a first statistical model representing error in the dynamic model and a second statistical model representing measurement error in the measured height and the measured slope;
computing, using the one or more processors, a first innovation between the predicted height and the measured height;
computing, using the one or more processors, a second innovation between the predicted slope and the measured slope;
comparing, using the one or more processors, the first innovation and the second innovation to an innovation covariance, wherein the innovation covariance is based on at least one of the first statistical model or the second statistical model;
identifying, using the one or more processors, each point in the at least one cell as a foreground point or a ground point based on a result of the comparing; and
updating, using the one or more processors, the predicted height of each identified ground point.

2. The method of claim 1, wherein the filter is a spatial Kalman filter configured to identify changes in terrain.

3. The method of claim 1, wherein the generating of the trajectory comprises:
generating, using the one or more processors, the trajectory in the driving area based on the updated ground points.

4. The method of claim 3, wherein the controlling of the vehicle comprises:
navigating, using a control circuit of the vehicle, the vehicle along the trajectory in the driving area.

5. The method of claim 1, further comprising classifying each point that is identified as a foreground point as a part of one of an object and a roadside curb.

6. The method of claim 5, wherein the classifying comprises:
for each point identified as a foreground point, determining, using the one or more processors, whether there are other foreground points higher or lower than the foreground point by a threshold amount;
in accordance with determining, using the one or more processors, that there are other foreground points higher or lower than the foreground point by a threshold amount, identifying, using the one or more processors, the foreground point as belonging to an object; and
in accordance with determining, using the one or more processors, that there are no other foreground points higher or lower than the foreground point by a threshold amount, identifying the foreground point as belonging to a roadside curb.

7. The method of claim 1, wherein the dynamic model is a constant-slope first order model.

8. The method of claim 1, wherein the first statistical model is tuned based on whether the vehicle is on road.

9. The method of claim 1, wherein the grid is a two-dimensional (2D) polar grid comprising multiple radial cells.

10. The method of claim 9, further comprising:
for each radial direction in the 2D polar grid, adding phantom points to the 2D polar grid for grid cells in a vicinity of the vehicle.

11. The method of claim 1, wherein the threshold is an innovation covariance based on a sum of the first statistical model and the second statistical model.

12. The method of claim 1, wherein the first statistical model represents a probability that the terrain will change within the cell.

13. The method of claim 1, wherein the predicted height and the predicted slope are computed by a spatial Kalman filter, wherein the first statistical model is a process noise covariance, wherein the second statistical model is a measurement noise covariance.

14. A method comprising:
receiving, using one or more processors of a vehicle, point cloud data output by one or more sensors of the vehicle;
transforming, using the one or more processors, the point cloud data into a grid comprising multiple cells;
for each point in each cell:
computing, using the one or more processors, a measured height of the point and a measured slope of terrain at the measured height in the grid;
computing, using the one or more processors, a predicted height of the point and a predicted slope of the terrain at the predicted height using a dynamic model;
computing, using the one or more processors, a first statistical model representing error in the dynamic model and a second statistical model representing measurement error in the measured height and the measured slope;
computing, using the one or more processors, a first innovation between the predicted height and the measured height;
computing, using the one or more processors, a second innovation between the predicted slope and the measured slope;
comparing, using the one or more processors, the first innovation and the second innovation to an innovation covariance, wherein the innovation covariance is based on at least one of the first statistical model or the second statistical model;
identifying, using the one or more processors, each point in each cell as a foreground point or a ground point based on a result of the comparing;
updating, using the one or more processors, the predicted height of each identified ground point;

generating, using the one or more processors, a route or trajectory in a driving area based on the updated ground points; and navigating, using a control circuit of the vehicle, the vehicle along the route or trajectory in the driving area.

15. The method of claim 14, wherein the points in the grid are processed in order according to respective distances of the points from the one or more sensors.

16. The method of claim 14, further comprising:
for each point identified as a foreground point, determining, using the one or more processors, whether or not there are other foreground points higher or lower than the foreground point by a threshold amount;
in accordance with determining, using the one or more processors, that there are other foreground points higher or lower than the foreground point by a threshold amount, identifying, using the one or more processors, the foreground point as belonging to an object; and
in accordance with determining, using the one or more processors, that there are no other foreground points higher or lower than the foreground point by a threshold amount, identifying the foreground point as belonging to a roadside curb.

17. The method of claim 14, wherein the dynamic model is a constant-slope first order model.

18. The method of claim 14, wherein the first statistical model is tuned based at least in part on whether the vehicle is on road or off road.

19. The method of claim 14, wherein the grid is a two-dimensional (2D) polar grid comprising multiple radial cells.

20. The method of claim 19, further comprising:
for each radial direction in the 2D polar grid, adding phantom points to the 2D polar grid for grid cells in a vicinity of the vehicle.

21. The method of claim 14, wherein the threshold is an innovation covariance based on a sum of the first statistical model and the second statistical model.

22. The method of claim 14, wherein the first statistical model represents a probability that the terrain will change within the cell.

23. The method of claim 14, wherein the predicted height and the predicted slope are computed by a spatial Kalman filter, the first statistical model is a process noise covariance and the second statistical model is a measurement noise covariance.

24. A foreground extraction system for a vehicle, the foreground extraction system comprising:
one or more sensors;
one or more processors of the vehicle;
memory storing instructions that when executed by the one or more processors, cause the one or more processors to perform operations comprising:
receiving data comprising multi-dimensional points from one or more sensors of the vehicle;
identifying points within the multi-dimensional points as foreground points or ground points using a filter;
generating a trajectory in a driving area for the vehicle using the identified foreground points and ground points; and
controlling the vehicle while the vehicle is traveling on the trajectory in the driving area;
the operations further comprising:
transforming the data into a grid comprising a plurality of cells;
for each point in at least one cell of the plurality of cells:
computing a measured height of the point and a measured slope of terrain at the measured height in the grid;
computing a predicted height of the point and a predicted slope of the terrain at the predicted height using a dynamic model;
computing a first statistical model representing error in the dynamic model and a second statistical model representing measurement error in the measured height and the measured slope;
computing a first innovation between the predicted height and the measured height;
computing a second innovation between the predicted slope and the measured slope;
comparing the first innovation and the second innovation to an innovation covariance, wherein the innovation covariance is based on at least one of the first statistical model or the second statistical model;
identifying each point in the at least one cell as a foreground point or a ground point based on a result of the comparing; and
updating the predicted height of each identified ground point.

25. The foreground extraction system of claim 24, wherein the filter is a spatial Kalman filter configured to identify changes in terrain.

26. The foreground extraction system of claim 24, wherein the generating of the trajectory comprises:
generating the trajectory in the driving area based on the updated ground points.

27. The method of claim 26, wherein the controlling of the vehicle comprises:
navigating, using a control circuit of the vehicle, the vehicle along the trajectory in the driving area.

28. A non-transitory computer program product storing instructions that, when executed by at least one programmable processor of a vehicle, cause the at least one programmable processor to perform operations comprising:
receiving data comprising multi-dimensional points from one or more sensors of the vehicle;
identifying points within the multi-dimensional points as foreground points or ground points using a filter;
generating a trajectory in a driving area for the vehicle using the identified foreground points and ground points; and
controlling the vehicle while the vehicle is traveling on the trajectory in the driving area;
the operations further comprising:
transforming the data into a grid comprising a plurality of cells;
for each point in at least one cell of the plurality of cells:
computing a measured height of the point and a measured slope of terrain at the measured height in the grid;
computing a predicted height of the point and a predicted slope of the terrain at the predicted height using a dynamic model;
computing a first statistical model representing error in the dynamic model and a second statistical model representing measurement error in the measured height and the measured slope;
computing a first innovation between the predicted height and the measured height;
computing a second innovation between the predicted slope and the measured slope;

comparing the first innovation and the second innovation to an innovation covariance, wherein the innovation covariance is based on at least one of the first statistical model or the second statistical model;
identifying each point in the at least one cell as a foreground point or a ground point based on a result of the comparing; and
updating the predicted height of each identified ground point.

\* \* \* \* \*

UNITED STATES PATENT AND TRADEMARK OFFICE
CERTIFICATE OF CORRECTION

PATENT NO. : 11,161,525 B2
APPLICATION NO. : 17/125789
DATED : November 2, 2021
INVENTOR(S) : Abbas Shikari, Jiaxin Li and Thomas Koelbaek Jespersen It is certified that error appears in the above-identified patent and that said Letters Patent is hereby corrected as shown below:

In the Claims

In Column 28, Line 33 (Claim 27), delete "method" and insert -- system --

Signed and Sealed this
Twenty-third Day of August, 2022

Katherine Kelly Vidal
*Director of the United States Patent and Trademark Office*